US006712542B2

(12) United States Patent  (10) Patent No.: US 6,712,542 B2
Buder  (45) Date of Patent: Mar. 30, 2004

(54) APPARATUS AND METHOD FOR ALTERING THE TENSION OF A CLAMPBAND

(75) Inventor: Daniel A. Buder, Tustin, CA (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 10/047,739

(22) Filed: Jan. 15, 2002

(65) Prior Publication Data

US 2003/0133748 A1 Jul. 17, 2003

(51) Int. Cl.[7] ................................................. F16B 2/14
(52) U.S. Cl. ................... 403/374.2; 403/28; 403/374.1; 24/279; 244/158 R
(58) Field of Search ................. 285/187, 365, 285/367, 407, 411; 403/28, 32, 179, 374.1, 347.2; 220/320, 319; 102/377, 378; 244/161, 158; 292/256.69; 24/279, 282

(56) References Cited

U.S. PATENT DOCUMENTS

| 4,681,353 A | * | 7/1987 | Halling ........................ 285/411 |
| 4,715,565 A | * | 12/1987 | Wittmann ............... 244/158 R |
| 4,743,079 A | | 5/1988 | Bloch |
| 4,819,307 A | * | 4/1989 | Turner ....................... 24/279 X |
| 5,060,888 A | | 10/1991 | Vezain et al. |
| 5,129,753 A | | 7/1992 | Wesley et al. |
| 5,160,233 A | | 11/1992 | McKinnis |
| 5,248,233 A | | 9/1993 | Webster |
| 5,312,152 A | | 5/1994 | Woebkenberg, Jr. et al. |
| 5,411,162 A | * | 5/1995 | Koziczkowski et al. .... 220/320 |
| 5,718,531 A | | 2/1998 | Mutschler, Jr. et al. |
| 5,722,709 A | | 3/1998 | Lortz et al. |
| 5,743,492 A | * | 4/1998 | Chan et al. .......... 244/158 R X |
| 6,126,115 A | | 10/2000 | Carrier et al. |
| 6,227,493 B1 | * | 5/2001 | Holemans ............... 244/158 R |
| 6,357,699 B1 | * | 3/2002 | Edberg et al. .......... 244/158 R |
| 6,454,214 B1 | * | 9/2002 | Smith ..................... 244/158 R |

* cited by examiner

Primary Examiner—Lynne H. Browne
Assistant Examiner—Jori Schiffman
(74) Attorney, Agent, or Firm—Alston & Bird LLP

(57) ABSTRACT

A releasable clampband apparatus and an associated method gently alter clampband tension, such that clampband tension may be reduced after the need for high clampband tension is no longer present, but before clampband separation. Thus, equipment or electronics contained in elements joined by the clampband are protected from excessive shock upon clampband separation. The releaseable clampband apparatus includes a discontinuous clampband having at least one opening. A connector is fixed to one side of the clampband opening and extends across the opening. A housing is fixed to the other side of the clampband opening and has a cavity surrounding at least a portion of the connector. A moveable positioning assembly is at least partially disposed within the housing cavity and is connected to the connector such that movement of the assembly with respect to the housing alters the clampband tension by varying the size of the opening.

21 Claims, 5 Drawing Sheets

APPARATUS AND METHOD FOR ALTERING THE TENSION OF A CLAMPBAND

FIELD OF THE INVENTION

This invention relates to an apparatus and method for altering the tension to which a clampband is subjected such that the tension may be reduced after the events requiring high clampband tension conclude, but before clampband separation.

BACKGROUND OF THE INVENTION

It is sometimes necessary to join various elements, at least temporarily, by clampbands. A clampband is generally made of one or more interconnected segments separated by respective openings. Typically, a connector extends across each opening in the clampband to allow the clampband to be tightened or loosened around the joined elements to be joined. The connector that extends across a respective opening may have various forms depending upon the application of the clampband.

To join elements, a clampband is placed around the abutting end portions of the elements and the clampband is tightened to exert enough tension to hold the elements together under the forces to which the elements are subjected. Typically, a respective fitting is mounted to the end portion of at least one element. Thus, the clampband can extend around and engage the fitting(s) so as to securely join the elements when subjected to the anticipated forces. The forces include, for instance, the weight of the elements and the forces exerted on the elements during their movement. For example, the clampband around the fitting must be tight enough to prevent the forces acting on the elements during movement from detaching the elements. In the aerospace industry, for instance, the elements joined by a clampband are generally heavy and subject to significant forces during movement, particularly during the take-off or launch. Specifically, a satellite launch vehicle, which is joined to a satellite by a clampband, is capable of lifting 2,000 to 31,000 pounds. In addition, the satellite and the launch vehicle are subject to significant forces during the launch process due to high inertial loads and acceleration of thrust. Thus, the connector that extends across the opening in the clampband utilized in satellite applications must tighten the clampband around the satellite and the launch vehicle to the extent necessary to securely join the elements and withstand the substantial forces acting thereupon.

In certain applications, clampbands are designed such that they may be released at a chosen time to purposefully separate the elements. The clampband release procedure may be manual or automated. To release the clampband, the clampband must be expanded and/or opened in some manner. Typically, releasing the clampband involves lengthening or detaching the connector that extends across the opening in the clampband. In the aerospace industry, for example, clampbands may be used to temporarily join launch vehicles to payloads, such that the launch vehicle may separate from the payload once it completes its function. Specifically, during the launch of a satellite, a clampband joins the satellite to the launch vehicle and once the launch vehicle transports the satellite to the desired location for orbit, the launch vehicle must separate from the satellite. One conventional clampband separation method is to cut the connector that extends across an opening in the clampband. Typically, the clampband includes a proximate automated cutter that is attached to a clampband segment, such that the connector may be cut and the clampband separated at a chosen time. At the time the connector is cut, the sudden tension release by the clampband creates a shock to the elements. The tighter the clampband is applied to the fitting(s) between the elements, the higher the tension the clampband exerts upon the fitting(s), and the larger the shock experienced by the elements upon clampband separation. Thus, elements that are heavy and/or that are subject to significant forces during movement, which must be held together temporarily by a clampband, experience a large shock upon clampband separation because of the tightness of the clampband.

If the elements include or contain equipment that is sensitive to sudden movement, then the shock created upon clampband separation may damage the equipment, particularly if the clampband is tightly attached to the fitting(s) between the elements. The shock created upon clampband separation is particularly problematic for satellites, which contain highly sensitive sensors and antennas, in addition to other precision equipment. The shock may damage the sensitive and expensive electronics of the satellite, which may decrease the effectiveness of the satellite or render the satellite useless.

In many applications, including the satellite example, the high tension of the clampband is necessary for only part of the period the elements are joined by the clampband because the forces exerted upon the elements may vary throughout the period. During the launch of a satellite, for instance, high tension in the clampband that joins the satellite and launch vehicle is necessary only during the initial launch period. In the initial launch period, the satellite and launch vehicle experience high inertial loads and acceleration, which necessitates high clampband tension to prevent the satellite from separating from the launch vehicle. The forces on the satellite and launch vehicle, however, are greatly reduced once they exit the earth's atmosphere. As such, by the time the clampband separates, it is not necessary that the clampband have such high tension. Nevertheless, without a way to reduce the tension of the clampband, the separation of the clampband will create a substantial shock that may damage the sensitive equipment in the satellite. Because there is currently no way to repair an orbiting satellite, the damage will likely result in the loss of a costly satellite.

Thus, there exists a need in the industry for a low cost apparatus that allows a gentle alteration in clampband tension such that the tension may be reduced after the need for high clampband tension no longer exists, but before clampband separation. An apparatus that allows a reduction in clampband tension would decrease the shock experienced by the elements joined by the clampband upon clampband separation and, therefore, reduce the risk of damage to sensitive equipment or electronics contained in the elements.

SUMMARY OF THE INVENTION

The present invention is directed to a releasable clampband apparatus and an associated method for altering the tension in a clampband. As such, the releaseable clampband apparatus and the associated method permit the clampband tension to be reduced prior to separation in order to decrease the shock sustained by the elements joined by the clampband upon its separation. The releaseable clampband apparatus includes a discontinuous clampband having at least one opening, a connector, a housing and a moveable positioning assembly. The connector is fixed to one side of an opening in the clampband and extends across the opening of the clampband. The housing is fixed to the other side of the opening in the clampband and has a cavity surrounding at least a portion of the connector. The moveable positioning assembly is at least partially disposed within the cavity of the housing and is connected to the connector such that movement of the moveable positioning assembly with respect to the housing alters the tension of the clampband by varying the size of the opening.

The releaseable clampband apparatus also may include a first piston body connected to the connector as part of the moveable positioning assembly. The first piston body may be sized and shaped to fit at least partially within the cavity of the housing. The first piston body also may have an aperture through which the connector extends.

A second piston body also may be included in the moveable positioning assembly. The second piston body may be sized and shaped to cooperate with the first piston body such that the second piston body also fits at least partially within the cavity of the housing. In addition, the moveable positioning assembly may have at least one pin extending between the first and second piston bodies. The pin may be adapted to change in length. Changing the pin length changes the position of the first and second piston bodies, which, in turn, causes the connector to move relative to the housing.

The releaseable clampband apparatus of one embodiment also includes a heating element that is disposed in thermal contact with at least one of the first and second piston bodies. As such, the pin may be made of a shape memory alloy, which changes in length depending upon whether it is subjected to heat. When the pin is heated, it may reduce in length to move the first and second piston bodies closer together. As the piston bodies move closer together, they slide further into the cavity of the housing. Because the connector moves in conjunction with the piston bodies, it correspondingly moves through the housing to increase the length of the connector across the opening in the clampband and, thus, reduce the tension in the clampband. To facilitate movement of the moveable positioning assembly relative to the housing, embodiments of the present invention may include at least one side of at least one of the first and second piston bodies facing the housing that may be inclined for engaging a correspondingly inclined wall of the cavity of the housing.

Therefore, to initially place the clampband around the elements, the moveable positioning assembly is built with a mechanically stretched pin or pins, is placed within the housing attached to one side of the opening in the discontinuous clampband, and surrounds one end of the connector. The other end of the connector may be loosely fixed to the other end of the discontinuous clampband, such that the clampband components may be assembled prior to placing the clampband around the elements, and the clampband may slide over at least one element to get to the joint where the clampband belongs. Alternatively, the clampband components may be assembled as they are placed around the joint. Sufficient torque is then applied to the connector to tightly fix the connector to each side of the opening in the discontinuous clampband and create clampband tension by decreasing the circumference of the clampband. Thus, the elements are tightly engaged by the clampband during the initial steps of movement, such as a flight, when the elements are subject to significant forces. During the later stages of the flight, when the forces exerted upon the elements decrease, the mechanically stretched pin(s) are heated to decrease the length of the pins, which increases the portion of the connector extending across the opening in the clampband and loosens the clampband while still retaining the elements. Finally, the connector of the loosened clampband is cut to separate the clampband once the elements no longer need to be joined.

The apparatus and method of the present invention provide a low cost and effective technique to gently alter clampband tension, such that clampband tension may be reduced after the need for high clampband tension is no longer present, but before clampband separation. Thus, the present invention protects sensitive and/or expensive equipment or electronics contained in the elements joined by the clampband from excessive shock upon clampband separation, which could cause damage to the equipment or electronics and result in the loss of a costly satellite.

BRIEF DESCRIPTION OF THE DRAWINGS

Figure 1:
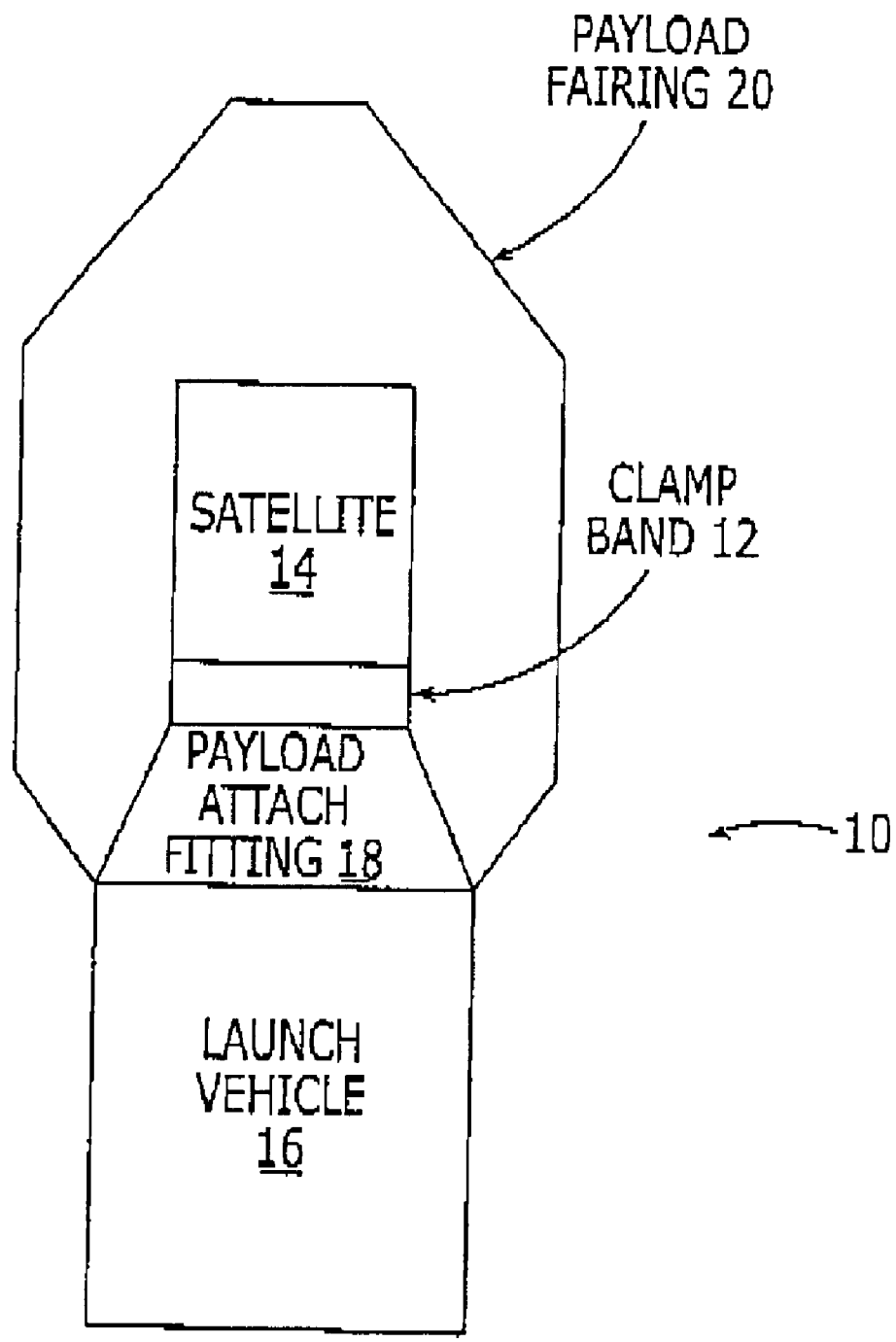
Figure 1A:
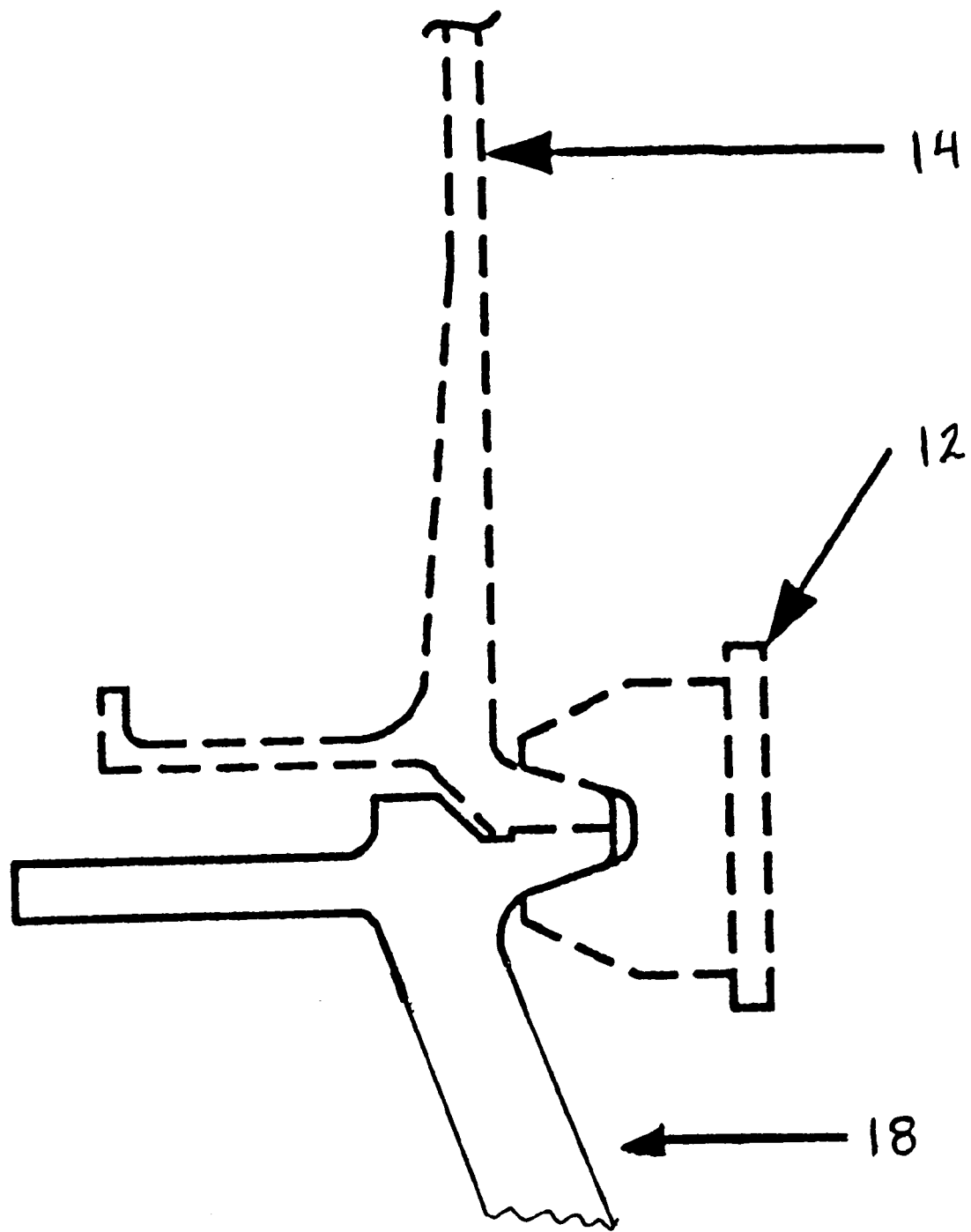
Figure 2:
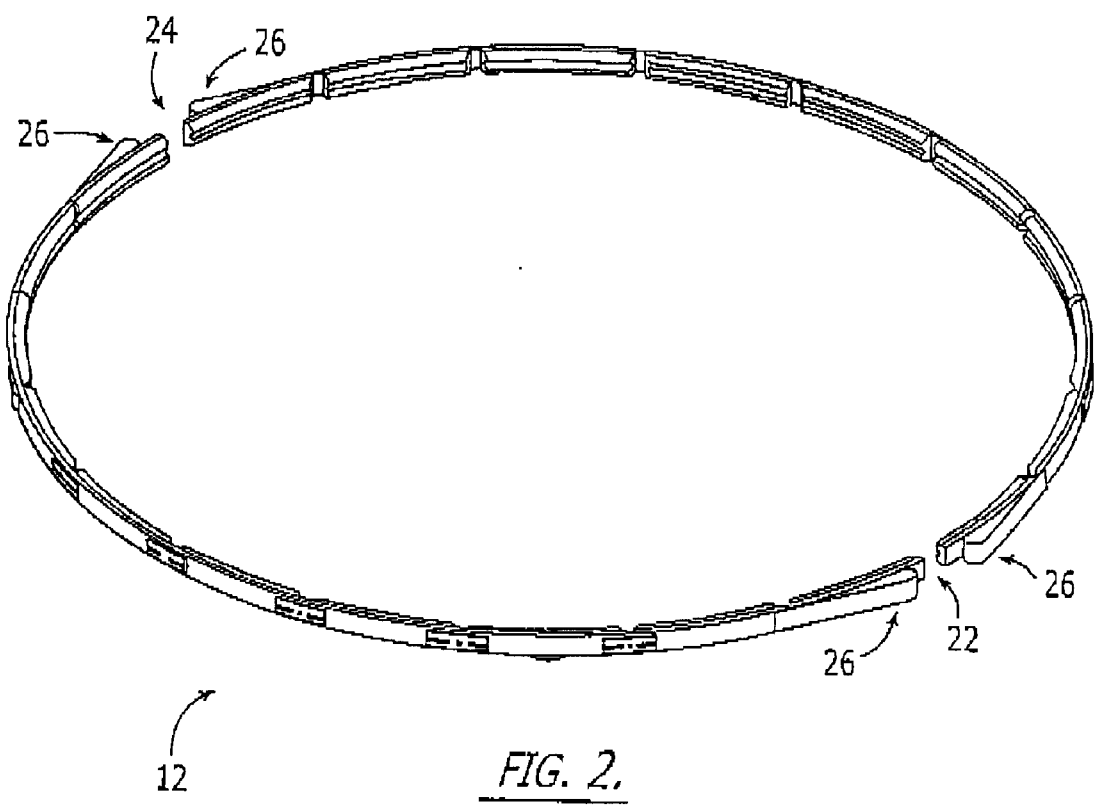
Figure 3:
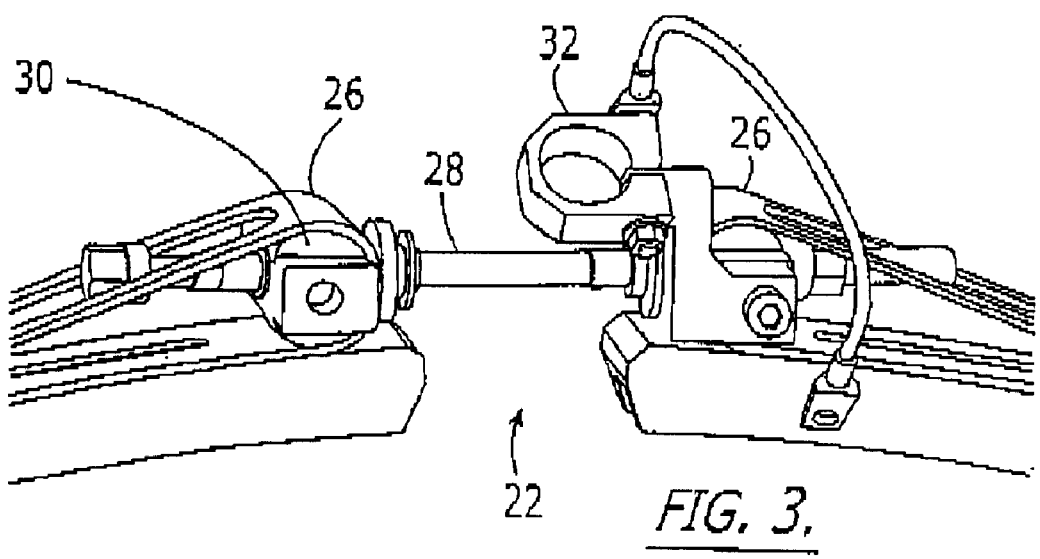
Figure 4:
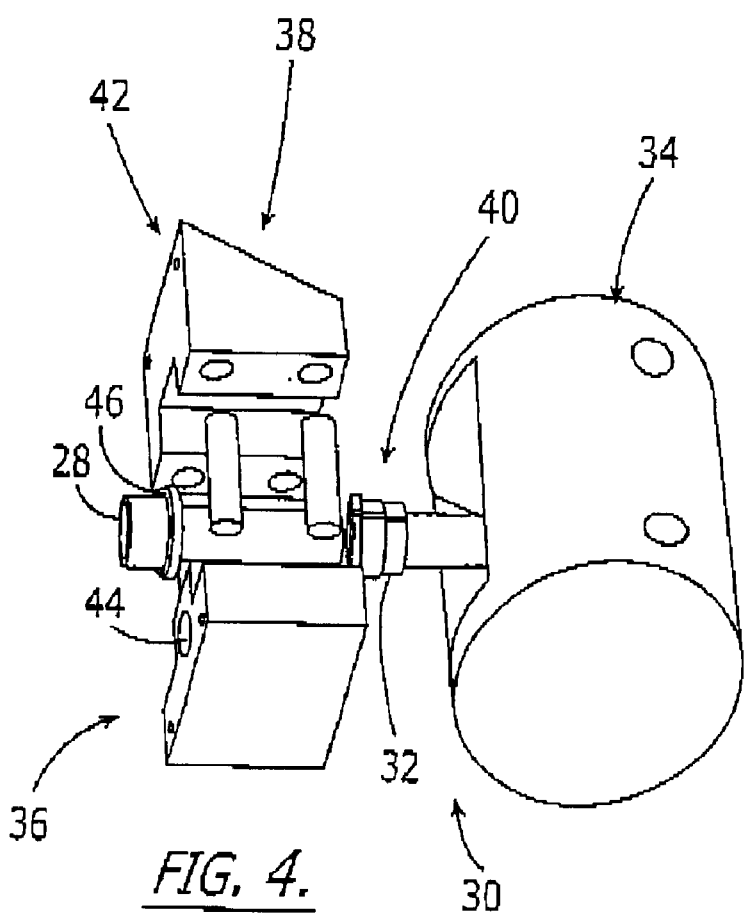
Figure 4A:
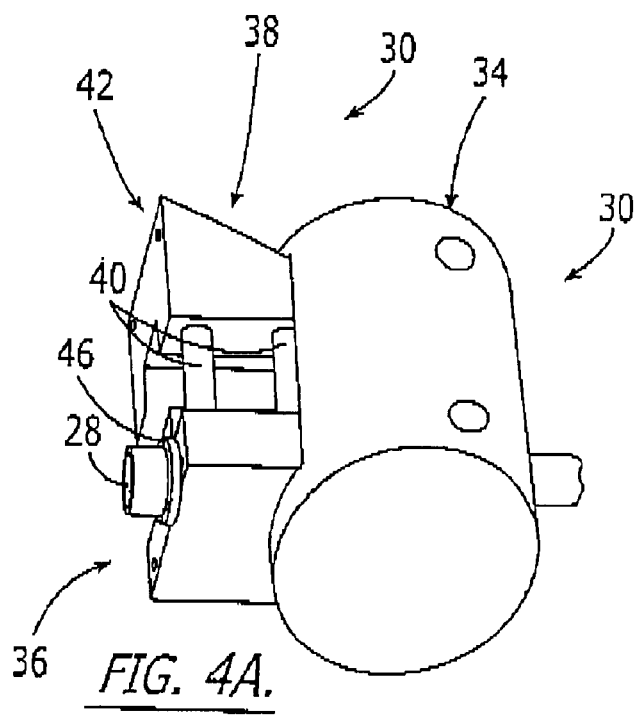
Figure 4B:
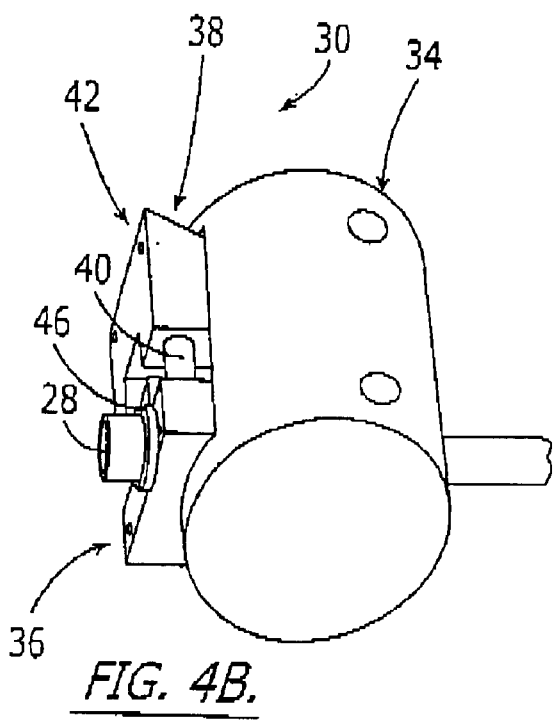

Having thus described the invention in general terms, reference will now be made to the accompanying drawings, which are not necessarily drawn to scale, and wherein:

FIG. 1 illustrates a clampband that joins a satellite to a launch vehicle according to one embodiment of the present invention;

FIG. 1A is a fragmentary side view of a clampband attaching a satellite to a payload attach fitting;

FIG. 2 is a perspective view of a clampband that has two openings according to one embodiment of the present invention;

FIG. 3 is a perspective view of the connector extending across an opening in a clampband and the components attached to the clampband according to one embodiment of the present invention;

FIG. 4 is a perspective view of the tension alteration apparatus components and the connector according to one embodiment of the present invention;

FIG. 4A is a perspective view of the tension alteration apparatus components and the connector in one position according to one embodiment of the present invention; and FIG. 4B is a perspective view of the tension alteration apparatus components and the connector in a second position according to one embodiment of the present invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

The present invention provides an apparatus and method to gently alter the tension of a clampband by releasing tension after the need for high tension no longer exists, but before clampband separation. Many clampband applications require high tension in a clampband for a relatively short period of the time that the clampband joins the elements, such as while the weight and force of movement of the elements creates substantial forces upon the elements. Once the events causing the substantial forces upon the elements conclude, the high tension of the clampband is unnecessary. If the clampband tension is not reduced, the sensitive equipment or electronics contained in the elements joined by the clampband may be damaged upon separation of the clampband due to the large shock generated as a result thereof. The present invention is advantageous because it is an economical technique to avoid excessive shock to the elements joined by the clampband upon clampband separation, which prevents damage to equipment or electronics contained in the elements.

A clampband may join together elements of a structure by surrounding end portions of the elements and, more commonly, fittings attached to end portions of the elements, with a band having the appropriate tension to prevent the elements from separating due to forces experienced by the elements due to the weight of the elements or the movement of the structure. FIG. 1 illustrates the location of a clampband 12 that joins a satellite 14 to a launch vehicle 16 according to one embodiment of the present invention. In this embodiment, the payload attach fitting 18 provides the transition from the top of the launch vehicle 16 to the satellite 14. As such, the clampband 12 preferably engages the payload attach fitting 18 and the adjacent portion of the satellite 14, as shown in FIG. 1A. As shown in FIG. 1, a payload fairing 20 shields the satellite 14 from buffeting and aerodynamic heating while flying through the earth's atmosphere. Once the satellite launch structure 10 exits the earth's atmosphere, the satellite 14 no longer needs the protection afforded by the payload fairing 20 and the payload fairing 20 separates from the satellite launch structure 10. The launch vehicle 16 proceeds to move the satellite 14 to the desired orbit before detaching from the satellite 14 through clampband separation. In this application, the initial tension of the clampband 12 must be sufficient to withstand the forces from the satellite inertial loads as the satellite launch structure 10 is propelled through the earth's atmosphere. Once the satellite launch structure 10 exits the earth's atmosphere, however, the need for the high tension of the clampband 12 no longer exists because of the absence of aerodynamic forces and because the satellite inertial loads are not as great since the acceleration is reduced.

FIG. 2 is a representation of a clampband 12. The clampband 12 is discontinuous and this embodiment shows two openings 22 and 24 in the clampband 12. The clampband 12 need not have two openings, but preferably has at least one opening located anywhere about its circumference. As a result of the opening, the clampband 12 is formed of a plurality of segments. The embodiment of the clampband 12 in FIG. 2 also has receptacles 26 proximate the openings 22 and 24. The receptacles 26 may receive a connector 28, such as a headed rod, surrounded by other components, as depicted in FIG. 3 and explained hereinafter.

The embodiment of the present invention illustrated in FIG. 3 includes a tension apparatus 30 held by a respective receptacle 26 through which the connector 28 extends. The connector 28 extends across the opening 22 in the clampband 12. As shown in FIG. 3, the receptacle 26 proximate the other side of the opening 22 may hold a cutting mechanism 33 through which the connector 28 also extends. The connector 28 depicted in this embodiment of the present invention is a bolt, but other embodiments may utilize any appropriate type of connector known to those skilled in the art. The tension apparatus 30 of the present invention contains the components that alter the tension in the clampband 12 by facilitating the movement of the connector 28, thereby widening or narrowing the opening 22. When the time comes for the elements held together by the clampband to detach, the cutting mechanism 33 cuts the connector 28 to cause clampband separation.

FIG. 4 represents the components of the tension apparatus 30 of one embodiment of the present invention and their interaction with the connector 28. The tension apparatus includes a housing 34 defining a cavity through which the connector 28 extends. The housing 34 may be any shape necessary to fit within the receptacle 26. A moveable positioning assembly is also partially disposed within the cavity of the housing 34. Since the moveable positioning assembly is also connected to a portion of the connector 28, movement of the moveable positioning assembly relative to the housing 34 correspondingly moves the connector 28, which alters the width of the opening 22 and, in turn, the tension with which the clampband 12 engages the elements.

The embodiment of the present invention depicted in FIG. 4 has a moveable positioning assembly that includes a first piston body 36, a second piston body 38 and at least one pin 40. The first piston body 36 is of a size and shape to fit at least partially within the cavity of the housing 34. In addition, the first piston body 36 may be secured to the connector 28 by any means known to those skilled in the art. For example, as FIG. 4 shows, the connector 28 may extend through the hole 44 in the first piston body 36 such that the first piston body 36 surrounds a portion of the connector 28. In order to secure the connector 28 to the first piston body 36, the embodiment depicted in FIG. 4 also shows that the connector 28 may have a circumferential rib 46 or other radially extending feature that is larger than the hole 44. Once the circumferential rib abuts the first piston body 36, the connector 28 will be prevented from being pulled further through the hole 44. To further secure the first piston body 36 to the connector 28 a nut 32 may be attached to the connector 28 on the other side of the hole 44 in the first piston body 36. While one technique for securing the connector 28 to the first piston body 36 is depicted in FIG. 4, other techniques may be utilized.

The second piston body 38 included in the embodiment of the present invention depicted in FIG. 4 is sized and shaped such that it cooperates with the first piston body 36. In this regard, FIG. 4 shows a rib extending along the side of the first piston body 36 that faces the second piston body 38 and a corresponding groove extending along the side of the second piston body 38 that faces the first piston body 36. As such, the rib fits within the groove to engage the first and second piston bodies 36, 38. The second piston body 38 also fits, at least partially, within the cavity of the housing 34. At least one pin 40 may extend between the first piston body 36 and the second piston body 38. as shown in FIG. 4. Both piston bodies may have aligned holes for the pin(s) or only one piston body may have a hole(s) for one end of the pin(s) if the other end of the pin(s) is connected to the surface of the other piston body. The pin 40 is adapted to change in length in order to move the first piston body 36 relative to the second piston body 38, i.e. by adjusting the spacing, if any, between the piston bodies, which, in turn, moves the connector 28 relative to the housing 34, as shown in FIGS. 4A and 4B and as explained below.

The pin 40 may be adapted to change in length by forming the pin 40 out of a shape memory alloy and disposing at least one heating element 42 in thermal contact with the first piston body 36, the second piston body 38 or both. Typical heating elements are 3/16-inch diameter Standard Cartridge Heaters, type C, Model C1010A made by Vulcan Electric. Shape memory alloys are known to those skilled in the art. Typical shape memory alloys are made of nickel and titanium, but other alloys exhibit the shape memory effect, such as some copper-based alloys. The shape memory effect is characterized as the ability to undergo internal crystalline phase transformation due to changes in temperature. The same change in temperature causes slightly different changes in the shape of different alloys. Therefore, selection of the particular alloy to be utilized in a specific application depends upon the change in shape that is desired and the change in temperature to be applied. In addition, because shape memory alloys are relatively low cost and only a small amount is needed for the pin 40, the apparatus for altering the tension of a clampband of the present invention provides an economical way to protect the sensitive electronics and equipment in a satellite from damage when the clampband is released.

To form the type of shape memory alloy pin 40 that may be employed in embodiments of the present invention, the alloy is physically elongated while it is at a temperature below the transition phase temperature of the alloy. As such, the shape memory alloy pin 40 will have low yield stress and modulus of elasticity at low temperatures and high yield stress and modulus of elasticity at elevated temperatures because of the shape memory alloy effect of internal crystalline phase transformation due to changes in temperature. Therefore, when the temperature of the shape memory alloy pin 40 is raised to its transition point, the pin 40 will shorten to its original length. To raise the temperature of the shape memory alloy pin 40, FIG. 4 illustrates the heating element 42 disposed in thermal contact with the second piston body 42. In other embodiments of the present invention, the heating element 42 may be disposed in thermal contact with the first piston body 36 or both the first and second piston bodies 36, 38.

When the pin 40 changes in length in response to heating, the connector 28 moves relative to the housing 34 as the first and second piston bodies 36, 38 move closer together or further apart. To facilitate movement of the first and second piston bodies 36, 38 that control the movement of the connector 28, at least one side of the first and second piston bodies 36, 38 that faces the housing 34 may be inclined. Correspondingly, the cavity of the housing 34 of this embodiment has at least one inclined wall facing the respective inclined side of the first and/or second piston bodies 36, 38. FIG. 4 depicts one embodiment of the present invention in which the second piston body 38 has an inclined side facing the housing 34 and a correspondingly inclined wall of the housing cavity facing the respective inclined side of the second piston body 38. Alternatively, the first piston body 36 may have an inclined side facing a correspondingly inclined wall of the housing cavity or both the piston bodies may have inclined sides facing the correspondingly inclined walls of the housing cavity. The piston side(s) are inclined such that the side(s) of the piston(s) that face opposite the opening 22 in the clampband are larger than the side(s) of the piston(s) that face the opening 22. In addition, the housing cavity wall(s) are correspondingly inclined such that the circumference of the cavity decreases as the cavity extends into the housing from the cavity opening that faces opposite the opening 22 in the clampband. For example, a preferable angle of incline for the piston side(s) and the cavity wall(s) is around twenty degrees.

Therefore, in one advantageous embodiment of the present invention, shown in FIGS. 4A and 4B when the heating element 42 increases the temperature of the moveable positioning assembly, the pin 40 decreases in length and the first and second piston bodies 36, 38 move closer together. As the first and second piston bodies 36, 38 move closer together, the correspondingly inclined sides of the second piston body 38 and the housing 34 cavity facilitate the movement of the first and second piston bodies 36, 38 further into the housing 34, i.e. in a right-ward direction for the embodiment shown in FIG. 4. Because the connector 28 is secured to the first piston body 36, the connector 28 also moves through the housing 34, such as in the right-ward direction in FIG. 4. The housing 34 is mounted within the receptacle 26 such that the housing 34 is stationary while the piston bodies 36, 38 and connector 28 move through it. As such, moving the connector 28 through the housing 34 increases the length of the portion of the connector 28 that extends across the opening 22 in the clampband, which decreases the tension of the clampband. An alternative embodiment of the present invention may involve decreasing the temperature of the moveable position assembly, which causes the pin 40 to return to its original, longer length. In this embodiment, the first 36 and second 38 piston bodies move apart and further out of the housing, i.e. in a left-ward direction for the embodiment of FIG. 4, facilitated by the correspondingly inclined sides described above, which decreases the portion of the connector 28 that extends across the opening 22 and increases the tension of the clampband. This embodiment is advantageous to tighten the clampband 12 around elements, such as when initially place the clampband 12 around the elements. First, the pin(s) 40 may be heated to increase the opening 22 between the clampband segments and increase the circumference of the clampband 12 such that it may be placed around the elements to be joined. The heat is then removed from the pin(s) 40 to decrease the circumference of the clampband 12 and tightly engage the elements during the initial steps of movement, such as a flight, when the elements are subject to significant forces.

Regardless of the embodiment of the present invention, the tension of the clampband is gently altered because changing the length of the pin 40 is a gradual event, which causes gradual related movements of the first and second piston bodies 36, 38 and the connector 28. Therefore, the present invention enables gentle alteration of the tension to which the clampband is subjected such that the tension may be reduced prior to clampband separation. For example, the high tension in the clampband that joins a satellite and launch vehicle is necessary only during the initial launch period when the satellite and launch vehicle experience significant forces and high acceleration. The forces exerted upon and the acceleration of the satellite and launch vehicle, however, are greatly reduced once they exit the earth's atmosphere and, by the time the clampband separates, it is not necessary that the clampband have such high tension. As such, the apparatus and method of the present invention enable loosening of the clampband while still retaining the elements to decrease the clampband tension. Therefore, the shock experienced by the satellite and launch vehicle is reduced when the connector for the loosened clampband is cut to allow the satellite to separate from the launch vehicle.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A releasable clampband apparatus, comprising:
 a discontinuous clampband having at least one opening defined between a first end and a second end of said clampband;

a connector extending across the opening of said clampband, wherein said connector is fixedly attached to one of the first end and second end of said clampband and moveably attached to the other one of the first end and second end of said clampband;

a housing surrounding a portion of said connector, wherein said housing defines a cavity and is attached to the other one of the first end and second end of said clampband; and a moveable positioning assembly at least partially disposed within the cavity defined by said housing, said moveable positioning assembly connected to said connector such that relative movement of said moveable positioning assembly with respect to said housing alters the tension to which said clampband is subjected, wherein said moveable positioning assembly comprises a first piston body and a second piston body, wherein the first piston body and second piston body are sized and shaped such that at least a portion of one of the first and second piston bodies fits within at least a portion of the other one of the first and second piston bodies.

2. The apparatus of claim 1, wherein said moveable positioning assembly comprises a first piston body connected to the connector, wherein the first piston body is sized and shaped to fit at least partially within the cavity defined by said housing.

3. The apparatus of claim 2, wherein said moveable positioning assembly further comprises a second piston body sized and shaped to cooperate with the first piston body so as to also fit at least partially within the cavity defined by said housing.

4. The apparatus of claim 1, wherein said moveable positioning assembly further comprises at least one pin extending between the first and second piston bodies and adapted to change in length in order to move the connector relative to said housing.

5. The apparatus of claim 4, further comprising a heating element disposed in thermal contact with at least one of the first and second piston bodies.

6. The apparatus of claim 5, wherein the pin is made of a shape memory alloy.

7. The apparatus of claim 1, wherein at least one side of at least one of the first and second piston bodies facing said housing is inclined and wherein said housing defines the cavity with at least one correspondingly inclined wall facing the respective inclined side of the piston bodies.

8. The apparatus of claim 1, wherein the first piston body defines an aperture through which said connector extends.

9. An apparatus for altering the tension of a discontinuous clampband having at least one opening defined between a first end and a second end of the clampband, comprising:

a connector extending across the opening of the clampband, wherein said connector is fixedly attached to one of the first end and second end of the clampband and moveably attached to the other one of the first end and second end of said clampband;

a housing surrounding a portion of said connector, wherein said housing defines a cavity and is attached to the other one of the first end and second end of the clampband; and a moveable positioning assembly at least partially disposed within the cavity defined by said housing, said moveable positioning assembly connected to said connector such that relative movement of said moveable positioning assembly with respect to said housing alters the tension to which the clampband is subjected, wherein said moveable positioning assembly comprises a first piston body and a second piston body, wherein the first piston body and second piston body are sized and shaped such that at least a portion of one of the first and second piston bodies fits within at least a portion of the other one of the first and second piston bodies.

10. The apparatus of claim 9, wherein said moveable positioning assembly comprises a first piston body connected to the connector, wherein the first piston body is sized and shaped to fit at least partially within the cavity defined by said housing.

11. The apparatus of claim 10, wherein said moveable positioning assembly further comprises a second piston body sized and shaped to cooperate with the first piston body so as to also fit at least partially within the cavity defined by said housing.

12. The apparatus of claim 9, wherein said moveable positioning assembly further comprises at least one pin extending between the first and second piston bodies and adapted to change in length in order to move the connector relative to said housing.

13. The apparatus of claim 12, further comprising a heating element disposed in thermal contact with at least one of the first and second piston bodies.

14. The apparatus of claim 13, wherein the pin is made of a shape memory alloy.

15. The apparatus of claim 9, wherein at least one side of at least one of the first and second piston bodies facing said housing is inclined and wherein said housing defines the cavity with at least one correspondingly inclined wall facing the respective inclined side of the piston bodies.

16. The apparatus of claim 9, wherein the first piston body defines an aperture through which said connector extends.

17. A method to alter tension in a clampband, comprising:

providing a discontinuous clampband having at least one opening defined between a first end and a second end of the clampband, a connector extending across the opening of the clampband and fixedly attached to one of the first end and second end of the clampband and moveably attached to the other one of the first end and second end of said clampband, a housing surrounding a portion of the connector, defining a cavity and attached to the other one of the first end and second end of the clampband, and a moveable positioning assembly at least partially disposed within the cavity defined by the housing, wherein providing the moveable positioning assembly comprises providing a first piston body and a second piston body sized and shaped such that at least a portion of one of the first and second piston bodies fits within at least a portion of the other one of the first and second piston bodies; and moving the moveable positioning assembly relative to the housing in order to alter the width of the opening defined by the clampband and correspondingly alter the tension in the clampband.

18. The method of claim 17, wherein providing the moveable positioning assembly comprises providing first and second piston bodies sized and shaped to cooperate so as to fit at least partially within the cavity defined by the housing and at least one pin extending between the first and second piston bodies, and further comprising heating the pin to alter the length of the pin in order to move the first and second piston bodies within the cavity defined by the housing.

19. The method of claim 18, wherein heating the pin comprises heating at least one of the first and second piston bodies.

20. The method of claim 18, wherein moving the moveable positioning assembly comprises moving the first piston body and the second piston body closer to one another.

21. The method of claim 20, wherein providing the first and second piston bodies comprises providing at least one of the first and second piston bodies with a side facing the housing that is inclined, wherein providing the housing comprises providing a housing having at least one correspondingly inclined wall facing the respective inclined side of the piston, and wherein moving the moveable positioning assembly comprises sliding the first and second piston bodies into the housing such that the inclined side and the inclined wall cooperate to move the first and second piston bodies closer to one another.

* * * * *